(12) United States Patent
Yamamoto et al.

(10) Patent No.: US 7,962,744 B2
(45) Date of Patent: Jun. 14, 2011

(54) TERMINAL COMMUNICATION SYSTEM

(75) Inventors: Masaaki Yamamoto, Yokohama (JP);
Yoshiaki Hiramatsu, Yokosuka (JP);
Satoshi Washio, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 1585 days.

(21) Appl. No.: 10/275,932

(22) PCT Filed: Apr. 18, 2002

(86) PCT No.: PCT/JP02/03860
§ 371 (c)(1),
(2), (4) Date: Nov. 8, 2002

(87) PCT Pub. No.: WO02/087149
PCT Pub. Date: Oct. 31, 2002

(65) Prior Publication Data
US 2003/0110374 A1    Jun. 12, 2003

(30) Foreign Application Priority Data

Apr. 19, 2001   (JP) .................. 2001-121567

(51) Int. Cl.
*H04L 29/06* (2006.01)
*H04L 29/00* (2006.01)
*H04L 29/12* (2006.01)

(52) U.S. Cl. ........ 713/155; 713/156; 713/159; 713/150; 726/2; 726/3; 726/4; 726/5; 709/229; 709/227; 709/219; 705/67; 705/64; 455/418; 455/419; 455/420

(58) Field of Classification Search .................. None
See application file for complete search history.

(56) References Cited

U.S. PATENT DOCUMENTS

| | | | |
|---|---|---|---|
| 5,721,781 A | 2/1998 | Deo et al. | |
| 6,023,764 A | 2/2000 | Curtis | |
| 6,223,291 B1* | 4/2001 | Puhl et al. | 726/28 |
| 6,421,716 B1* | 7/2002 | Eldridge et al. | 709/219 |
| 6,463,534 B1* | 10/2002 | Geiger et al. | 713/168 |
| 6,826,690 B1* | 11/2004 | Hind et al. | 713/186 |
| 6,950,808 B1* | 9/2005 | Kyojima et al. | 705/65 |
| 6,980,660 B1* | 12/2005 | Hind et al. | 380/282 |
| 7,114,070 B1* | 9/2006 | Willming et al. | 713/156 |
| 7,330,974 B1* | 2/2008 | Silverbrook et al. | 713/176 |
| 7,359,507 B2* | 4/2008 | Kaliski | 380/30 |
| 7,698,549 B2* | 4/2010 | Thornton et al. | 713/156 |
| 7,742,605 B2* | 6/2010 | Hornak | 380/277 |
| 7,788,493 B2* | 8/2010 | Mononen et al. | 713/170 |
| 2001/0014911 A1* | 8/2001 | Doi et al. | 709/221 |

(Continued)

FOREIGN PATENT DOCUMENTS

JP    9-74408    3/1997

(Continued)

*Primary Examiner* — Syed A. Zia
(74) *Attorney, Agent, or Firm* — Brinks Hofer Gilson & Lione

(57) ABSTRACT

Portable terminal MS downloads coupon data and public key KEYP2 of IP server 20 from IP server 20. Service terminal T obtains from IP server 20, a server certificate to which a digital signature is applied by secret key KEYS2. One to one local communication by infrared radiation is performed between portable terminal MS and service terminal T. At this point, portable terminal MS decrypts a server certificate by utilizing public key KEYP2 of IP server 20. Then, portable terminal MS communicates specified data after authenticating the identity of service terminal T.

29 Claims, 5 Drawing Sheets

U.S. PATENT DOCUMENTS

| | | | |
|---|---|---|---|
| 2001/0055388 A1* | 12/2001 | Kaliski, Jr. | 380/30 |
| 2002/0165912 A1* | 11/2002 | Wenocur et al. | 709/203 |
| 2002/0173296 A1* | 11/2002 | Nordman et al. | 455/414 |
| 2002/0194137 A1* | 12/2002 | Park et al. | 705/64 |
| 2003/0002521 A1* | 1/2003 | Traversat et al. | 370/465 |
| 2003/0050963 A1* | 3/2003 | Lamming et al. | 709/203 |
| 2003/0140226 A1* | 7/2003 | Yamamoto et al. | 713/156 |
| 2003/0149874 A1* | 8/2003 | Balfanz et al. | 713/168 |
| 2004/0103283 A1* | 5/2004 | Hornak | 713/175 |
| 2006/0179003 A1* | 8/2006 | Steele et al. | 705/59 |
| 2006/0273163 A1* | 12/2006 | Gusler et al. | 235/383 |
| 2007/0181675 A1* | 8/2007 | Drummond et al. | 235/381 |
| 2008/0216153 A1* | 9/2008 | Aaltonen et al. | 726/3 |
| 2009/0210293 A1* | 8/2009 | Steele et al. | 705/10 |
| 2010/0306546 A1* | 12/2010 | Willey et al. | 713/175 |

FOREIGN PATENT DOCUMENTS

| | | |
|---|---|---|
| JP | 11-31204 | 2/1999 |
| JP | 2000-059357 A | 2/2000 |
| JP | 2000-235340 A | 8/2000 |
| JP | 2001-84311 | 3/2001 |
| JP | 2001-351032 | 12/2001 |

* cited by examiner

TERMINAL COMMUNICATION SYSTEM

TECHNICAL FIELD

The present invention relates to a terminal communication system which enables a plurality of communication terminals to perform communication with other terminals through a network, and each communication terminal performs local communication with other communication terminals without a network.

BACKGROUND ART

Electronic commerce, such as, ordering books or reserving tickets, is generally performed in daily life by transmitting a request from a portable terminal through the Internet. In electronic commerce, a goods order is transmitted to a virtual store, more specifically, to a server connected to the Internet. Then, goods, such as tickets, are mailed to an orderer or to a store, such as a convenience store. In the case of a store, an orderer needs to visit a store to obtain the tickets.

Electronic commerce is performed through a communication network, such as the Internet, which any number of people can communicate, therefore, a sender (E.g. a user) and a receiver (E.g. a server) must be identified to prevent impersonation. To this end, a two-way authentication system utilizing a public key encryption system is known. In an authentication process, a sender transmits a public key to a certificate authority. Then, a certificate authority generates an encrypted public key by encrypting a public key with a secret key of a certificate authority, and returns to a sender, a certificate including an encrypted public key. A receiver also obtains a certificate from the certificate authority.

Then, a sender and a receiver exchange a certificate with each other over the Internet before transmitting money data or personal data and the like, and decrypt the exchanged certificate by utilizing a public key of the certificate authority to perform two-way authentication. That is to say, two-way authentication in electronic commerce is performed by exchanging a certificate over the Internet.

When two-way authentication is performed successfully, electronic commerce can be performed. Then, a receiver transmits goods to a sender, and collects money from a sender when electronic commerce is performed successfully.

On the other hand, electronic commerce is also performed without two-way authentication. For example, electronic commerce utilizing a service terminal installed at store, such as a convenience store is well-known. In this case, a service terminal is connected to a communication network; and functions as a kind of a vending machine. When a user operates a service terminal and inserts coins equivalent to services, such information is notified to a server through a communication network; and services, such as issue of concert tickets, and download of game software are performed under control of a server. Then, a user is able to obtain concert tickets, game software and the like from a service terminal.

So far, two modes of electronic commerce have been described, but while each have their advantages, they each also have their disadvantages.

In the first example of electronic commerce, transmission and reception of information is performed through a communication network; thus, a user is able to obtain goods without using actual money (coins). However, a portable telephone itself has no function to issue tickets or the like, and a user is therefore only able to obtain goods by mail and the like. Accordingly, a user must wait for a period of time to obtain goods.

In the second example of electronic commerce, a user has only to visit a store to obtain desired goods, as the goods are issued or provided from a service terminal directly. However, in this electronic commerce, neither two-way authentication between a user and a server, and nor transmission and reception of money data is performed. Accordingly, a user is not able to obtain goods without paying money.

In electronic commerce, the means such as, two-way authentication through a communication network, and transmission and reception of money information, are not utilized, because it is difficult to protect a user and receiver (a goods provider) by the above means. That is to say, a user feels insecurity in inputting authentication information, money information and the like into a service terminal which is not authenticated; and a receiver also feels insecurity in providing goods by relying on authentication information, money information and the like provided by a service terminal user who is not identified.

DISCLOSURE OF INVENTION

In view of the foregoing, it is an object of the present invention to provide means which makes electronic commerce possible through a service terminal without inconvenience (E.g. using money).

Specifically, the present invention makes electronic commerce possible between a portable terminal, which a user carries, and a service terminal by utilizing one to one local communication. To perform such electronic commerce, solutions must be provided to prevent impersonation of a service terminal, and to prevent money information being left. The object of the present invention is to provide solutions for the above problems.

The present invention provides a terminal communication method wherein a portable terminal obtains specified data from a server, a service terminal obtains from a certificate authority, a server certificate encrypted by a secret key of the certificate authority, the portable terminal obtains the server certificate from the service terminal and verifies the server certificate on the basis of a public key of the certificate authority, and the portable terminal transmits the specified data to the service terminal using local communication without a network in the case that the service terminal is authenticated on the basis of the server certificate.

In a preferred embodiment, the server utilizes a public key of the certificate authority to verify a server certificate obtained from the service terminal; and transmits to the portable terminal, a communication application for executing a process to transmit the specified data to the service terminal in the case that an authentication result is obtained showing that the service terminal is authenticated; and the portable terminal transmits the specified data by executing the communication application.

In another preferred embodiment, the portable terminal obtains from the certificate authority, a client certificate encrypted by a secret key of the certificate authority; and the service terminal obtains the client certificate from the portable terminal, verifies the client certificate on the basis of a public key of the certificate authority, and performs local communication with the portable terminal in the case that a positive authentication result is obtained.

In another preferred embodiment, the portable terminal performs communication with the server via a radio communication network.

In another preferred embodiment, the portable terminal decrypts the server certificate by utilizing a public key of the local authority to determine authenticity of the service terminal.

In another preferred embodiment, the service terminal decrypts the client certificate by utilizing a public key of the local authority to determine authenticity of the portable terminal.

In another preferred embodiment, communication between the portable terminal and the service terminal is performed by infrared radiation communication or close distance radio communication.

In another preferred embodiment, communication between the portable terminal and the service terminal is encryption communication.

In another preferred embodiment, the server functions as the certificate authority, or the certificate authority functions as the server.

The present invention also provides a terminal communication system comprising a certificate authority; a server; a service terminal; and a portable terminal, and the service terminal comprises means for storing a server certificate issued by the certificate authority; and means for transmitting the server certificate to the portable terminal in response to a request from the portable terminal; and the portable terminal comprises means for obtaining specified data from the server; means for obtaining the server certificate from the service terminal; means for verifying the server certificate by utilizing a public key of the certificate authority; and means for transmitting specified data to the service terminal in the case that an authentication result is obtained showing that the service terminal is authenticated.

In a preferred embodiment, the server authenticates a server certificate obtained from the service terminal by utilizing a public key of the certificate authority, and comprises means for transmitting to the portable terminal, a communication application for executing a process to transmit the specified data to the service terminal in the case that an authentication result is obtained showing that the service terminal is authenticated; and the portable terminal transmits the specified data by executing the communication application.

The service terminal obtains the client certificate from the portable terminal, verifies the client certificate by utilizing a public key of the certificate authority, and comprises means for permitting local communication with the portable terminal in the case that an authentication result is obtained showing that the service terminal is authenticated.

In a preferred embodiment, the server functions as the certificate authority, or the certificate authority functions as the server.

The present invention also provides a portable terminal comprising means for obtaining specified data from a server; means for obtaining a server certificate from a service terminal which holds the encrypted server certificate on the basis of a secret key of a certificate authority; means for verifying the server certificate on the basis of a public key of the certificate authority; and means for transmitting the specified data to the service terminal in the case that an authentication result is obtained showing that the service terminal is authenticated.

In a preferred embodiment, the portable terminal utilizes a public key of the certificate authority to verify the server certificate obtained from the service terminal, and comprises means for obtaining from the server, a communication application for performing a process to transmit the specified data to the service terminal, and transmits the specified data by executing the communication application.

In another preferred embodiment, the portable terminal comprises means for obtaining from the certificate authority, a client certificate for certifying authenticity of the portable terminal, and means for transmitting the client certificate to the service terminal.

The present invention also provides a service terminal comprising means for transmitting a server certificate issued by a certificate authority in response to a request from a portable terminal; means for obtaining a client certificate issued by the certificate authority from the portable terminal; means for verifying the client certificate by utilizing a public key of the certificate authority; and means for performing communication with the portable terminal, and obtaining specified data which the portable terminal obtains from a server in the case that an authentication result is obtained showing that the service terminal is authenticated.

A program transmitted from a server to a portable terminal via a network, and executed by a control computer of the portable terminal wherein a program for enabling a control computer to perform a process for requesting a server certificate from a communication partner, a process for verifying the server certificate by utilizing a public key of a certificate authority, and a process for transmitting specified data, obtained from the server, to the communication partner in the case that an authentication result is obtained showing that the communication partner is authenticated.

In a preferred embodiment, the program includes the specified data and the public key.

The present invention is also performed in the following mode. A server performs communication with a portable terminal, transmits an application program to a portable terminal, and stores the application program in a storage medium which can be detachable to a portable terminal and computer-readable when determining to provide goods or services with a portable terminal user through a service terminal. The application program is a program for enabling a computer of a portable terminal to perform an authentication process of a service terminal, and a process for transmitting to a service terminal which is authenticated, goods or necessary specified data for providing services. A user visits a place which is possible to communicate with a service terminal by local communication, and operates a portable terminal to perform application program in storage medium. As a result, local communication is performed between a portable terminal and a service terminal, the service terminal is authenticated through local communication, and specified data is transmitted to the service terminal from the portable terminal in the case that an authentication result is obtained showing the service terminal is authenticated. In this case, the storage medium may be a HDD (Hard Disk Drive), a portable terminal memory such as, a RAM, a UIM card, or a SIM card.

BEST MODE FOR PERFORMING THE INVENTION

The embodiments will now be described with reference to the drawings. The following embodiments describe examples of the present invention, but are not to be taken as limiting; and the scope of the present invention is open to a variety of modifications.

1. First Embodiment

<1-1. Configuration of the First Embodiment>
<1-1-1. Overall Configuration of a Terminal Communication System>

Figure 1:
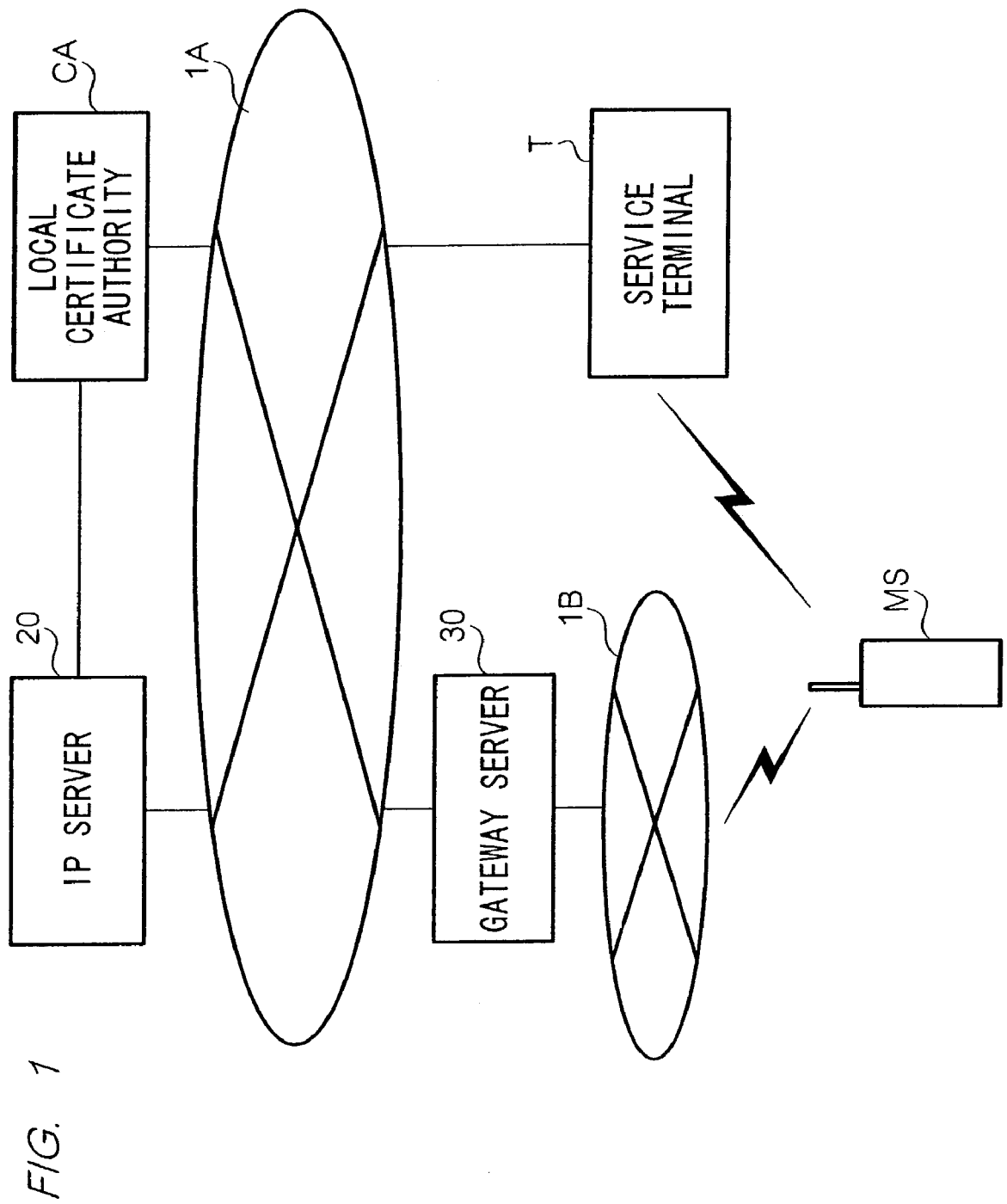
FIG. 1 is a block diagram explaining the overall configuration of a terminal communication system according to a first embodiment of the present invention.

FIG. 1 is a block diagram explaining the overall configuration of a terminal communication system according to a first embodiment of the present invention. As shown in this figure, the terminal communication system is comprised of communication network NET 1, local certificate authority CA, IP (Internet Provider) server 20, gateway server 30, mobile communication network NET2, portable terminal MS, and service terminal T. In the figure, one portable terminal MS and one service terminal T are described, however, the number of portable terminal MS and one service terminal T is greater than one in reality.

Communication network 1A functions as a line for data communication, for example and may be the Internet or a private line. Local certificate authority CA and IP server 20 are connected to communication network 1A. Mobile. communication network 1B is comprised of a plurality of base stations, exchange stations, and subscriber process device (not shown here); and performs radio communication with portable terminal MS. Gateway server 30 is a computer system installed at a gate relay exchange station to connect communication network 1A and mobile communication network 1B each other. According to the present embodiment, data communication between communication network 1A and mobile communication network 1B is performed by functions of gateway server 30.

Portable terminal MS can communicate with IP server 20 through mobile communication network 1B, gateway server 30, and communication network 1A. Also, service terminal T can communicate with local certificate authority CA through communication network 1A. Portable terminal MS and service terminal T can then perform one to one local communication without the need for a network.

In resource including a communication application, URL corresponding to resources is installed. IP server 20 abstracts URL including a GET request obtained from communication network 1A, and returns resources corresponding to URL, to communication network 1A.

Portable terminal MS may be a portable telephone, PDA (Personal Digital Assistants) and the like if it is a portable terminal which is possible to carry, in this case, portable terminal MS is a portable telephone. Then, while portable terminal MS performs data and sound communication through mobile communication network 1B, portable terminal MS also performs data communication with service terminal T by infrared radiation. Further, portable terminal MS has a WWW (World Wide Web) browser, therefore, a portable terminal MS user can view a page of IP server 20 (resource). Also, WWW browser installed in portable terminal MS has a viewer function for Java applet; and when portable terminal MS views a WWW page, Java applet designated by tag may be downloaded and performed by WWW browser. Additionally, portable terminal MS also functions to perform various applications downloaded from IP server 20.

Service terminal T is usually installed at a store such as a convenience store, or in a station yard; and issues concert or train tickets, or transmits game programs, music data and the like to portable terminal MS. Also, service terminal T has interface to perform data communication with IP server 20 or local certificate authority CA, and further has infrared radiation interface to perform one to one local communication with portable terminal MS.

In the embodiment, the following electronic commerce will be performed by the above described descriptions. Firstly, IP server 20 transmits transaction data (E.g. money data, issue data for issuing tickets, obtainment data for obtaining game programs, or coupon data worth for exchanging with goods.) in response to a request from portable terminal MS. Upon transmission of the transaction data to portable terminal MS, a billing process to a portable terminal MS user is usually performed. Next, a portable terminal MS user visits a store where service terminal T is installed, and performs communication for electronic commerce with service terminal T by portable terminal MS. In the communication, transaction data is transmitted from portable terminal MS to service terminal T, and service terminal T provides goods, more specifically, a process for issuing tickets and the like is performed if transaction data is authenticated.

Two means will be described according to the system of the present invention to perform such safe electronic commerce.
A. Means that portable terminal MS confirms that service terminal T is the authenticated terminal.
B. Means that transaction data owned by IP server 20 is transmitted to authenticated portable terminal MS, and the transaction data is transmitted from authenticated portable terminal MS to service terminal T.

Firstly, A Means will be described. Local certificate authority CA has a function to perform a digital signature; and local certificate authority CA has a pair of its own public key and secret key. Also, when local certificate authority CA obtains a request from a reliable person, local certificate authority CA issues an electronic certificate to the person. In more detail, a local certificate authority CA holder, a IP server 20 holder and a service terminal T holder constitute multiple persons each of who, in the operation of the present embodiment, are connected confidentially; and a community, for providing services with a portable terminal MS user, is configured. Local certificate authority CA issues a certificate to a claimant on condition that the certificate claimant is authorized as a member of the community.

Also, local certificate authority CA is a certificate authority which has a tree layer structure. In the tree layer structure, a certificate authority is authorized by a host certificate authority; and has a route certificate showing a certificate authority is authorized by host certificate authority. The route certificate is issued by host certificate authority. Then, when certificate authority authorizes lower certificate authority, certificate authority issues to lower certificate authority, a certificate showing lower certificate is authorized by certificate authority and its own route certificate.

In FIG. 1, service terminal T is under control of local certificate authority CA. Accordingly, local certificate authority CA issues server certificate Cs which service terminal T is authorized by local certificate authority CA, and its own route certificate Cr.

A message and a message digest are included in server certificate Cs. Firstly, the following information is included in a message:
(1) Version number: This shows a certificate version.
(2) Serial number: This is a number uniquely assigned to each certificate issued by local certificate authority CA.

(3) Signature algorism: This is an encrypted algorism utilized when local certificate authority CA applies a signature to a certificate. For example, SHA-1 as hash algorism, RSA as means of encryption and so on.
(4) Subject: This is information regarding a person to be certified, such as, a person's name, a company name, and a country code.
(5) Validity: This shows a period of time for which a certificate is valid.
(6) Signer: This is the name of local certificate authority CA, company name, country code and the like.
(7) Public key KEYP1: This is the public key for local certificate authority CA.

The information above comprises the detailed contents included in a message. The message is encrypted by secret key KEYS1 of local certificate authority CA and may be decrypted by public key KEYP1 of local certificate authority CA.

A message digest is the generated information that message is compressed by a hash function, and compressed message is encrypted by secret key KEY S1 of local certificate authority CA.

IP server 20 has functions to perform communication by a public key encryption system, and digital signature; and is comprised of a pair of public key KEYP2 and secret key KEYS2. Also, IP server 20 is authenticated by local certificate authority CA; and has a certificate. The certificate includes route certificate Cr issued by local certificate authority CA. Further, a management body for IP server 20 is the same as that used for local certificate authority CA, for example, it may be a convenience-store chain which manages convenience stores.

Portable terminal MS obtains public key KEYP1 of local certificate authority CA from IP server 20 when obtaining transaction data from IP server 20. Then, portable terminal MS requests a certificate obtained from local certificate authority CA, to service terminal T when portable terminal MS and service terminal T performs digital communication for electronic commerce, and portable terminal MS confirms authenticity of service terminal T by public key KEYP1 when the certificate is transmitted. Then, portable terminal MS performs communication for electronic commerce with service terminal T only in the case authenticity of service terminal T is confirmed.

Next, B Means will be described. In the embodiment, portable terminal MS transmits outside, transaction data obtained from IP server 20 only by utilizing a communication application downloaded from IP server 20, and a communication application transmits transaction data outside after confirming whether a communication partner is authenticated service terminal T. For example, it may be performed by following procedures. Firstly, IP server 20 transmits to portable terminal MS, communication application including transaction data, public key KEYP1 of local certificate authority CA, and each routine for process for obtaining a server certificate from communication partner, performing authentication of server certificate by utilizing public key KEYP1, and transmitting transaction data to communication partner when an authentication result, which communication partner is authenticated, is obtained. Then, portable terminal MS performs communication application. For example, communication application is a Java applet. In general, Java applet is limited to communicate only with a source performing a download when communication is performed through a network, however, local communication with service terminal T is not communication through a network, and local communication is consequently beyond the above limit.

Thus, portable terminal MS communicates with service terminal T by performing communication application, and transmits transaction data to service terminal T only in the case authenticity of service terminal T is confirmed. According to the above method, transaction data is only transmitted to service terminal T which is confirmed to be authenticated in the performing process of communication application. That is to say, illegal copying of transaction data is prevented.

Figure 2:
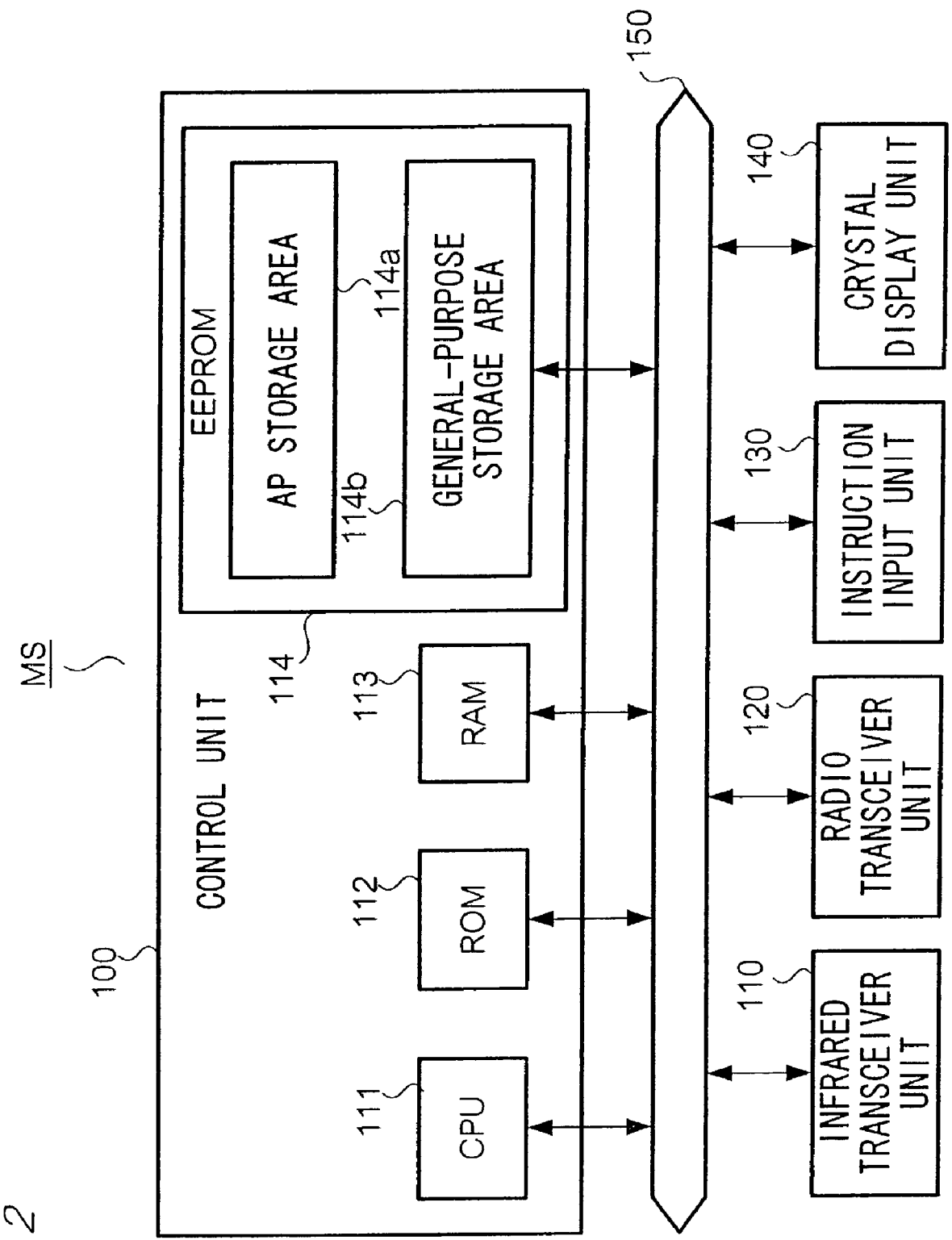
FIG. 2 is a block diagram explaining an example of a configuration of portable terminal MS in the system.

Next, configuration of portable terminal MS will be described with reference to FIG. 2. As shown in the figure, portable terminal MS according to the embodiment is comprised of control unit 100, infrared transceiver unit 110, radio transceiver unit 120, instruction input unit 130, crystal display unit 140, and bus 150 which connects each unit for transmission and reception of data mutually.

Infrared transceiver unit 110 performs infrared communication with service terminal T under control of control unit 100. Also, radio transceiver unit 120 performs radio communication with a base station of communication network 1B under control of control unit 100.

Instruction input unit 130 is comprised of various types of buttons, such as PB (Push Button), and cursor keys, and provides with control unit 100, an operation signal corresponding to input operation when a user performs an input operation. Crystal display unit 140 is configured by a display unit, such as a crystal panel; and displays a variety of information under control of control unit 100.

Control unit 100 is comprised of CPU (Central Processing Unit) 111, ROM (Read Only Memory) 112, RAM (Random Access Memory) 113, EEPROM 114; and controls each unit of portable terminal MS. Various communication applications such as, a control communication application, WWW browser described above, a communication application in accordance with public key encryption system and the like are installed in ROM 112.

RAM 113 is utilized as work area for CPU 111, for example, HTML data and a communication application downloaded from IP server 20 are stored in RAM 113 temporarily.

EEPROM 114 is comprised of a communication application storage area (AP storage area) 114a, general-purpose storage area 114b. Communication application downloaded from IP server 20 is stored. Route certificate Cr and transaction data downloaded from IP server 20, secret key KEYS4, and public key KEYP4 are stored in general-purpose storage area 114b. Also, when communication application is performed, CPU 111 generates random numbers, common key KEYX by utilizing random numbers, and stores common key KEYX in general-purpose storage area 114b.

Figure 3:
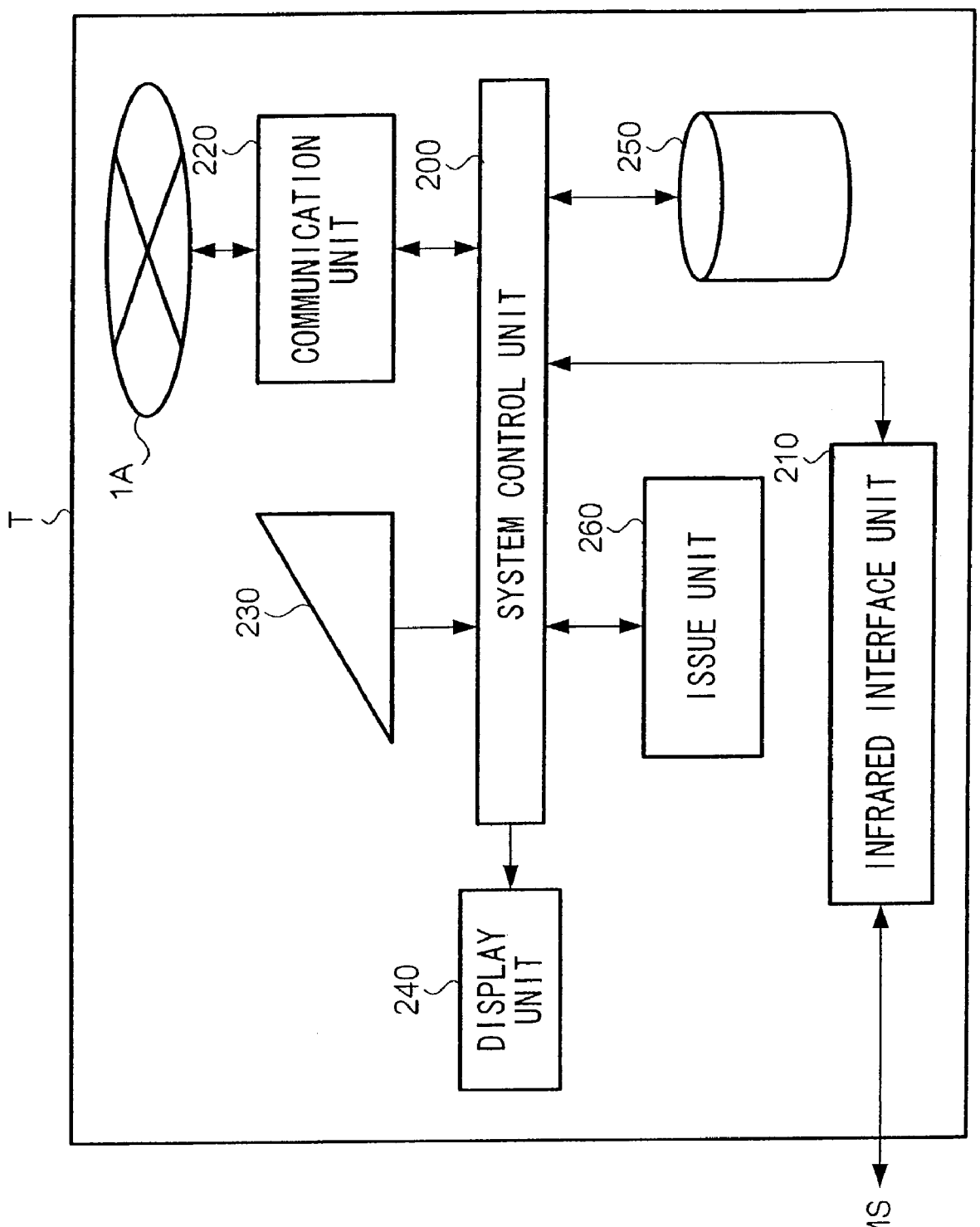
FIG. 3 is a block diagram explaining an example of a configuration of service terminal T in the system.

Next, configuration of service terminal T will be described with reference to FIG. 3. As shown in FIG. 3, service terminal T according to the embodiment is comprised of system control unit 200, infrared interface unit 210, communication unit 220, input unit 230, display unit 240, hard disk 250, and issue unit 260. Communication unit 220 performs data communication through communication network 1A. Service terminal T performs transmission and reception of various data with IP server 20 by the data communication.

System control unit 200 is comprised of CPU, ROM, and RAM (not shown here); and functions as the nerve center controlling each unit of service terminal T. Also, a communication application in accordance with public key encryption system, secret key KEYS3 and public key KEYP3 which are utilized while performing a communication application, and the like are stored in Hard disk 250.

Infrared interface unit 210 performs data communication with portable terminal MS by utilizing infrared radiation in accordance with public key encryption system. Communication unit 220 performs data communication through communication network 1A. Service terminal T performs transmission and reception of various data with local certificate authority CA by data communication, and obtains a certificate including server certificate Cs and route certificate Cr.

Input unit 230 has a keyboard, a mouse and the like; and a user inputs operation instructions by input unit 230.

Display unit 240 is configured by a crystal display unit and a television monitor and the like; and displays operation details of input unit 230 and process in response to instruction(s) input in portable terminal MS. Issue unit 260 issues tickets under control of system control unit 200; and has a print function.

<1-2. Operation of the First Embodiment>

Figure 4:
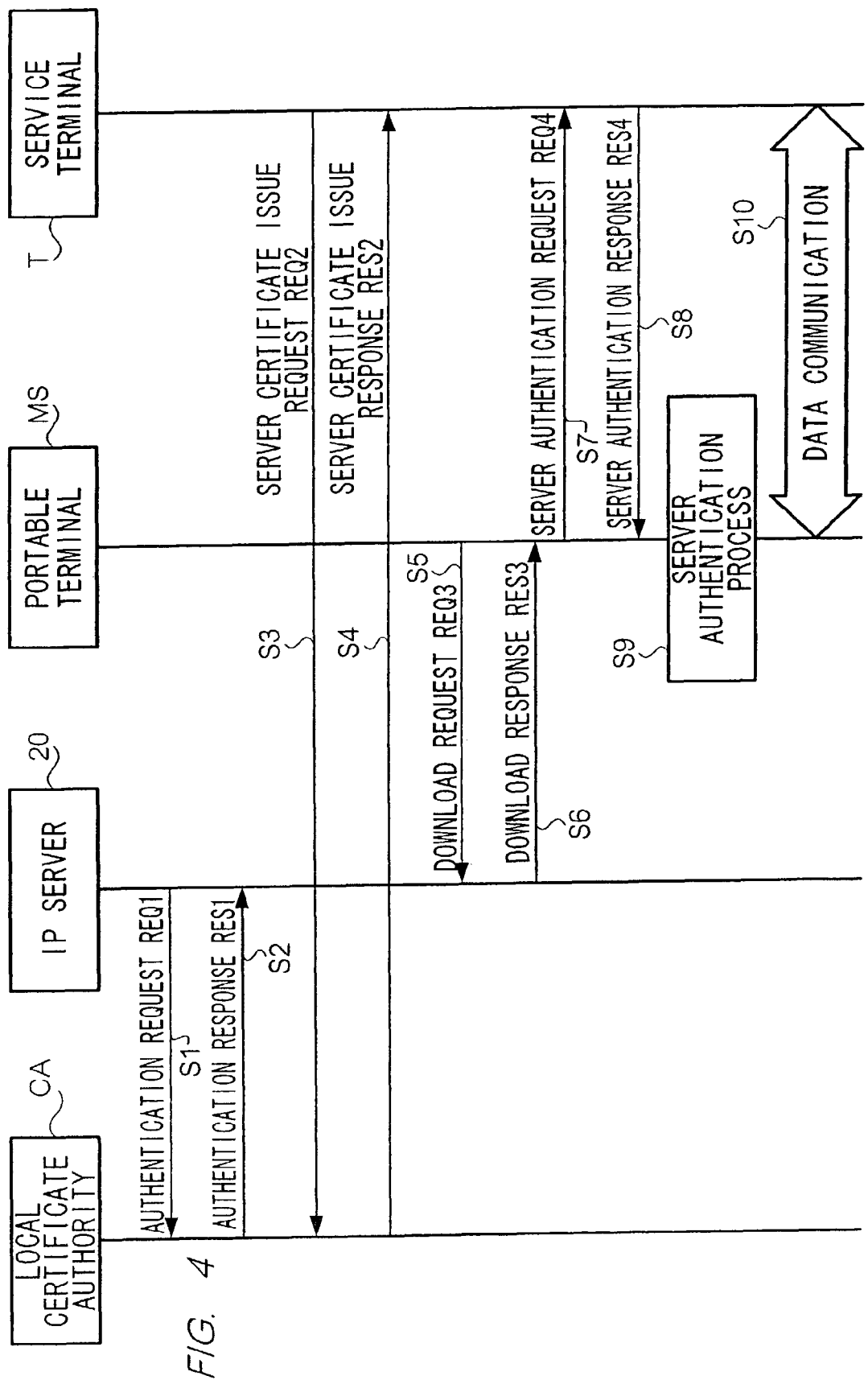
FIG. 4 is a sequence diagram explaining an example of an operation of the system.

FIG. 4 is a sequence diagram explaining an example of an operation of the system.

In the embodiment, IP server 20 and service terminal T are authenticated by local certificate authority CA in advance for performing safe electronic commerce. Process for Step 1 to Step 4 in FIG. 4 corresponds to the above one. The process has only to be completed by the time a portable terminal MS user starts electronic commerce.

Firstly, IP server 20 transmits to local certificate authority CA, authentication request REQ1 requesting a certificate that IP server 20 is a authenticated server. (Step S1) Authentication request REQ1 includes public key KEYP2 and holder information INF2. Holder information INF2 is text data showing that a public key KEYP2 holder is IP server 20.

Next, when local certificate authority CA confirms that IP server is authenticated, local certificate authority CA encrypts public key KEYP2 of IP server 20 and holder information INF2 by utilizing secret key KEYS1 which local certificate authority CA holds, and generates public key certificate C2. Local certificate authority CA returns to IP server 20, authentication response RES1 including public key certificate C2 and route certificate Cr. (Step S2) IP server 20 transmits route certificate Cr to portable terminal MS if necessary.

On the other hand, service terminal T transmits server certificate issue request REQ2 to local certificate authority CA to certify that service terminal T is authenticated. (Step S3) Server certificate issue request REQ2 includes public key P3 of service terminal T and holder information INF3. Holder information INF3 is text data showing that a public key KEYP3 holder is service terminal T.

Next, when local certificate authority CA obtains server certificate issue request REQ2, local certificate authority CA issues server certificate Cs described above by encrypting public key KEYP3 and holder information INF3, and transmits to service terminal T, as server certificate issue response RES2 with route certificate Cr. (Step S4) When server certificate Cs is decrypted by public key KEYP1 of local certificate authority CA, service terminal T obtains public key KEYP3 and holder information INF3.

In this case, local certificate authority CA issues server certificate Cs only to service terminal T under control of local certificate authority CA. For example, a portable terminal MS user may access local certificate authority CA to request authentication with his/her own PC, however, local certificate authority CA refuses the request, which is not from service terminal T, for issuing server certificate Cs. Accordingly, a user cannot obtain server certificate Cs.

This description solely concerns IP server 20 authentication and service terminal T authentication by local certificate authority CA.

Next, electronic commerce performed by a request from portable terminal MS will be described. Firstly, when portable terminal MS accesses IP server 20 through communication network 1A and mobile communication network 1B, and transmits download request REQ3 to IP server 20 (Step 5), IP server 20 returns download response RES3 to portable terminal MS. (Step 6)

Download response RES3 includes public key KEYP1 of local certificate authority CA, route certificate Cr, a communication application for performing communication with service terminal T by infrared radiation, and transaction data, such as coupon data. A communication application permits to transmit transaction data from portable terminal MS only in the case specified server certificate Cs is confirmed; and public key KEYP1 is utilized to confirm server certificate Cs.

Further, portable terminal MS may request IP server 20 to transmit public key certificate C2 before transmitting transaction data. Then, portable terminal MS may verify public key certificate C2 obtained from IP server 20 by utilizing public key KEYP2 of IP server 20 obtained from another safe route; encrypt billing data attached to public key certificate C2 by utilizing public key KEYP2; and transmit encrypted billing data to IP server 20.

Next, when a user visits a store, and operates portable terminal MS to start a communication application obtained at Step S6, portable terminal MS starts performing one to one local communication with service terminal T by utilizing infrared radiation. In this local communication, firstly, portable terminal MS transmits server authentication request REQ4 to service terminal T (Step 7); and service terminal T returns server authentication response RES4 to portable terminal MS. (Step 8) Server certificate Cs is included in server authentication request REQ4.

Then, portable terminal MS performs server authentication process. (Step 9) Firstly, portable terminal MS decrypts server certificate Cs by utilizing public KEYP1 of local certificate authority CA, and abstracts a message digest and a message. Secondly, portable terminal MS compresses the message using a hash function, and generates a message digest for comparison. Thirdly, portable terminal MS compares a decrypted message digest with the message digest for comparison, and determines whether the messages are identical. Fourthly, in the case that they are identical, portable terminal MS authenticates that service terminal T is authenticated, and starts performing data communication. If not, portable terminal MS finishes data communication since service terminal T is not authenticated.

The above authentication process is performed on the basis of public key KEYP1 of local certificate authority CA; and it is important that public key KEYP1 is designated by a communication application. Thus, IP server 20 permits to transmit transaction data, which portable terminal MS has downloaded from IP server 20, only to service terminal T authenticated by specified certificate authority (In this case, local certificate authority CA) on the basis of a communication application.

According to authentication method utilizing certificates on the Internet, various certificate authorities exist; and communication is usually performed when a communication partner is authenticated by any certificate(s). However, illegal copying of transaction data issued from IP server 20 could be made in the above authentication method. For example, a portable terminal MS user obtains a certificate from certificate authority by utilizing his/her PC, and transmits transaction data to the PC from portable terminal MS. In this case, portable terminal MS would transmit transaction data to the PC by confirming the certificate as the PC obtains the certificate issued by certificate authority. When transaction data is transmitted to the PC in this manner, illegal copying of transaction data would be performed easily. To prevent illegal copying of transaction data, in the embodiment, local certificate authority CA limits a partner to give server certificate Cs; and a communication application permits to transmit transaction data only to specified service terminal T by confirming server certificate Cs with public key KEYP1. That is to say, transaction data is not transmitted to service terminal T which is not authenticated, and therefore illegal copying of transaction data can be prevented.

Next, when service terminal T is confirmed to be authenticated, portable terminal MS performs data communication with service terminal T. (Step 10) Data communication will be performed according to following procedures. Firstly, CPU 111 of portable terminal MS generates random numbers to generate common key KEYX. Secondly, CPU 111 encrypts common key KEYX on the basis of public key KEYP3 of service terminal T attached to server certificate Cs to generate encrypted common key KEYX'. Thirdly, portable terminal MS transmits encrypted common key KEYX' to service terminal T. Fourthly, service terminal T decrypts encrypted common key KEYX' by utilizing secret key KEYS3 to abstract common key KEYX. Fifthly, portable terminal MS and service terminal T performs encryption communication by utilizing common key KEYX.

In this case, coupon data and personal data are transmitted from portable terminal MS to service terminal T, if a third person tries to intercept such data, such data is encrypted by common key KEYX, therefore, it is very difficult for a third person to interpret such data. Then, service terminal T transmits music data and game program to portable terminal MS; or issues concert tickets on condition that service terminal T obtains transaction data issued by IP server 20.

According to the present embodiment, it is possible to prevent impersonation of service terminal T and illegal copying of transaction data as service terminal T is authenticated on the basis of server certificate Cs issued by local certificate authority CA in local communication performed between portable terminal MS and service terminal T.

Further, in a case service terminal T is installed in an underground shopping center where radio waves can not penetrate, portable terminal MS performs local communication with service terminal T to obtain server certificate Cs. Therefore, portable terminal MS transmits transaction data only to authenticated service terminal T.

In addition, a management body for IP server 20 is the same as that used for local certificate authority CA; that is to say, a certificate certifying a communication partner for communication, and data utilized for communication are issued by the same source. Accordingly, according to the embodiment, communication is performed with a communication partner authenticated by the source for issuing a certificate, and by utilizing data obtained from the source for issuing data, therefore, security is improved.

2. Second Embodiment

Next, a second embodiment of the present invention will be described with reference to the drawings. In a terminal communication system according to the first embodiment, data communication gets started between portable terminal MS and service terminal T on condition that portable terminal MS authenticates service terminal T. On the other hand, in a terminal communication system according to the second embodiment, portable terminal MS and service terminal T perform two-way authentication. The overall configuration of terminal communication system in the second embodiment is the same as that of terminal communication system in the first embodiment in FIG. 1, and therefore explanation will be omitted.

In the embodiment, local certificate authority CA issues a certificate to portable terminal MS as well as service terminal T. Certificate, issued to portable terminal MS, includes client certificate Cc and route certificate Cr. Client certificate Cc is the certificate for certifying that portable terminal MS is authenticated; and includes a message encrypted by secret key KEYS1 and a message digest.

Figure 5:
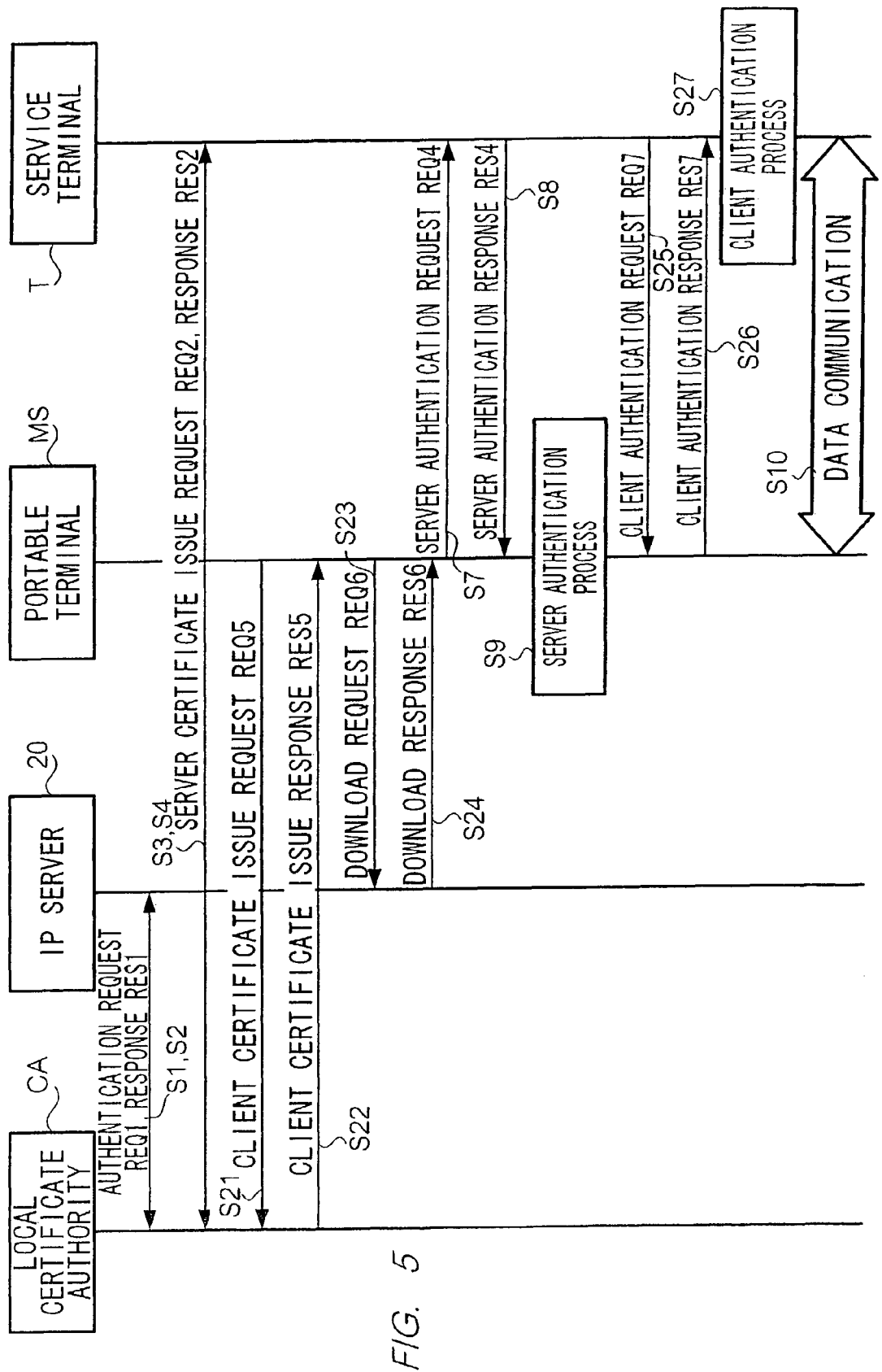
FIG. 5 is a sequence diagram explaining an example of an operation of a terminal communication system according to a second embodiment of the present invention.

FIG. 5 is a sequence diagram explaining an example of an operation of a terminal communication system according to a second embodiment of the present invention. A process executed between authentication request REQ1 to server certificate response RES2 (Step 1 to Step 4) is the same as that of the first embodiment of terminal communication system in FIG. 4.

In the embodiment, portable terminal MS needs to obtain client certificate Cc from local certificate authority CA since service terminal T authenticates portable terminal MS. As a result, portable terminal MS transmits client certificate issue request REQ5 to local certificate authority CA. (Step 21) Client certificate issue request REQ5 includes public key KEYP4 of portable terminal MS, holder information INF4 and the like. Holder information INF4 is text data showing that a public key KEYP4 holder is portable terminal MS, for example, it may be a telephone number for portable terminal MS and identification number.

When local certificate authority CA obtains client certificate issue request REQ5, local certificate authority CA issues client certificate Cc, to which a digital signature is applied, by utilizing secret key KEYS1 which local certificate authority CA holds, and transmits to portable terminal MS, client certificate issue response REQ6 including client certificate Cc and route certificate Cr. (Step 22)

Then, when portable terminal MS accesses IP server 20, and transmits download request REQ6 (Step 23), IP server 20 transmits download response RES6 to portable terminal MS. (Step 24) Download response RES6 includes transaction data such as coupon data described in the first embodiment, a communication application, and public key KEYP1 of local certificate authority CA.

A process executed between server authentication request REQ4 to server authentication (Step 7-Step 9) is the same as that described in the first embodiment. After completion of server authentication process (Step 9), service terminal T transmits client authentication request REQ7 to portable terminal MS (Step 25); and portable terminal MS returns client authentication response RES7 including client certificate Cc, to service terminal T. (Step 26)

Next, service terminal T performs client authentication process. (Step 27) Firstly, service terminal T decrypts client certificate Cc by utilizing public key KEYP1 of local certificate authority CA, and abstracts a message digest and a message. Secondly, service terminal T compresses a message using a hash function, and generates a message digest for comparison. Thirdly, service terminal T compares a decrypted message digest with the message digest for comparison, and determines whether the messages are identical. Fourthly, in the case that they are, service terminal T authenticates that portable terminal MS is authenticated, and starts performing data communication. Fifthly, in the case that they are not identical, service terminal T cuts data communication since portable terminal MS is not authenticated. The same data communication operation performed in the first embodiment is performed only in the case that portable terminal MS is confirmed to be authenticated. (Step 10)

As described above, according to this embodiment, portable terminal MS and service terminal T perform two-way authentication in one to one local communication; therefore, impersonation of service terminal T and portable terminal MS is prevented.

In addition, server certificate Cs and client certificate Cc, both of which are utilized for authentication, are issued by the same source (Local Certificate Authority CA), therefore, verification for local certificate authority CA need not be carried out by utilizing a certificate issued by a host certificate authority. Thus, a server authentication process and client authentication process are simplified.

3. Modifications

The first and second embodiments are described above, however, the present invention is not limited to the embodiments; and may be performed in various modifications described below.

(1) According to the embodiments described above, portable terminal MS and service terminal T perform communication by infrared radiation, a communication system on the basis of IrDA (Infrared Data Association) may be applied besides that using infrared radiation. Also, communication is performed by radio transmission. In this case, a communication antenna with a base station may be used as one for radio communication with service terminal T. Further, Bluetooth, performing close distance radio communication by utilizing 2.4 Ghz band, may be applied as a radio communication system.

(2) According to the embodiments described above, IP server 20 and local certificate authority CA are described as a separate unit, however, IP server 20 and local certificate authority CA may be a combined unit. That is to say, if a server for authenticating service terminal T and a server for distributing a communication application and coupon data are managed by the same body, there is no problem that if it is physically configured by one server, or two servers.

(3) According to the embodiments described above, data communication between portable terminal MS and service terminal T (Step 10 in FIG. 4 and FIG. 5) is performed by utilizing SSL (Secure Socket Layer), however, a digital signature for transmission and reception of transaction data may be utilized. Two modes described below are provided in digital signature system.

The first mode is that IP server 20 generates transaction data encrypted by its own secret key KEYS2, transmits it to portable terminal MS; and portable terminal MS performs data communication with service terminal T by utilizing encrypted transaction data. In this case, a digital signature is applied to transaction data by IP server 20, therefore, service terminal T is able to confirm whether transaction data is definitely generated by IP server 20 by public key KEYP2 of IP server 20 obtained in advance.

The second mode is such that portable terminal MS and service terminal T give a digital signature to transaction data to be transmitted each other. For example, when a concert ticket is issued, firstly, portable terminal MS generates identification data, and date and time data showing transaction date and time along with money data and coupon data as a message. Secondly, portable terminal MS compresses a message on the basis of hash function to generate a message digest. Thirdly, portable terminal MS encrypts a message digest on the basis of secret key KEYS4 of portable terminal MS. Fourthly, portable terminal MS generates random numbers to generate a session key, and encrypts a message with a session key. Fifthly, portable terminal MS encrypts the session key on the basis of public key KEYP3 of service terminal T to generate an encrypted session key. Sixthly, portable terminal MS transmits an encrypted message digest, encrypted message, and encrypted session key to service terminal T.

Service terminal T which have obtained the above messages will decrypt the messages according to the following procedures. Firstly, service terminal T decrypts encrypted session key on the basis of secret key KEYS3 of service terminal T to obtain a session key. Secondly, service terminal T decrypts encrypted message on the basis of session key. Thirdly, service terminal T compresses decrypted message by hash function to generate a message digest. Fourthly, service terminal T decrypts encrypted message digest on the basis of public key KEYP4 of portable terminal MS. Fifthly, service terminal T compares decrypted message digest with message digest generated by hash function, and determines whether both messages are identical. Sixthly, if the both ones are identical, service terminal T authenticates that the messages are surely transmitted from portable terminal MS.

Further, when transaction data is transmitted from service terminal T to portable terminal MS, the same procedures will be performed.

(4) According to the second embodiment described above, service terminal T performs client authentication process after portable terminal MS performs server authentication process at first, it may be performed that portable terminal MS performs server authentication process after service terminal T performs client authentication process at first. Specifically, in a sequence diagram shown in FIG. 5, process for Step 7 to Step 9 may be performed after process for Step 25 to Step 27.

(5) According to the embodiments described above, portable terminal MS performs data communication with service terminal T by utilizing coupon data issued by IP server 20, however, the present invention is not limited to the above mode, transaction data issued by the other server is utilized as well. For example, IP server 20 is the server which manages a convenience store, and other server, which manages other convenience store, is also provided. Further, a host server which manages each server for each store (That is to say, a server which manages a convenience store chain) is provided; and it is supposed that a host server issues common transaction data for each IP server 20. In this case, portable terminal MS may be configured to obtain transaction data from a host server, and authenticated by utilizing a client certificate which a host server issues.

(6) According to the embodiments described above, transaction data is transmitted from server to service terminal T through portable terminal MS, however, scope of application of the present invention is not limited to such distribution of transaction data.

The present invention may be applied for distribution of specified data except for transaction data, such as music data, image data, or text data.

For example, the following system may be performed. A server authenticates a communication partner, and transmits to portable terminal MS, a communication application for transmitting music data. Portable terminal MS performs a communication application. Portable terminal MS obtains an encrypted server certificate from service terminal T, and authenticates authenticity of service terminal T in the process of performing a communication application. Then, an authentication result which service terminal T is authenticated, that is to say, only in the case encrypted server certificate is decrypted, portable terminal MS transmits music data to service terminal T. Service terminal T playbacks music data only once.

According to such a program, illegal copying of music data is prevented.

As described above, according to the present invention, when one to one direct communication is performed between portable terminal MS and service terminal T, safety of electronic commerce and the like are improved by preventing impersonation, and the present invention further prevents illegal copying of transaction data which portable terminal MS obtained from specified server.

The invention claimed is:

1. A terminal communication method, comprising:
obtaining, at a portable terminal, specified data from a server not via a service terminal;
obtaining, at the service terminal from a certificate authority, a server certificate encrypted by a secret key of the certificate authority, the server certificate indicating certification of the service terminal, the service terminal being a device different from the server;
receiving, at the portable terminal, a communication application from the server not via the service terminal, the communication application comprising a public key of the certificate authority and a program for performing local communication with the service terminal,
obtaining, at the portable terminal, the server certificate from the service terminal;
verifying, at the portable terminal, the server certificate on the basis of the public key of the certificate authority included in the communication application; and
when the service terminal is authenticated by the portable terminal on the basis of the server certificate, transmitting, from the portable terminal to the service terminal, the specified data using local communication without a network by executing the program, in the communication application, to authenticate the portable terminal and perform local communication with the service terminal.

2. A terminal communication method according to claim 1, further comprising:
obtaining, at the portable terminal from the certificate authority, a client certificate encrypted by the secret key of the certificate authority;
obtaining, at the service terminal, the client certificate from the portable terminal,
verifying, at the service terminal, the client certificate on the basis of the public key of the certificate authority, and
performing, at the service terminal, local communication with the portable terminal in a case that a positive authentication result is obtained.

3. A terminal communication method according to claim 1, wherein:
the portable terminal performs communication with the server via a radio communication network.

4. A terminal communication method according to claim 1, wherein:
the portable terminal decrypts the server certificate by utilizing the public key of the certificate authority to determine authenticity of the service terminal.

5. A terminal communication method according to claim 2, wherein:
the service terminal decrypts the client certificate by utilizing the public key of the certificate authority to determine authenticity of the portable terminal.

6. A terminal communication method according to claim 1, wherein:
communication between the portable terminal and the service terminal is performed by infrared radiation communication or close distance radio communication.

7. A terminal communication method according to claim 1, wherein:
communication between the portable terminal and the service terminal is encrypted communication.

8. A terminal communication method according to claim 1, wherein:
the server functions as the certificate authority, or the certificate authority functions as the server.

9. A portable terminal, comprising:
first receiving means that obtains specified data from a server not via a service terminal;
second receiving means that obtains a server certificate from a service terminal that holds an encrypted server certificate on the basis of a secret key of a certificate authority, the server certificate indicating certification of the service terminal, the service terminal being a device different from the server;
third receiving means that receives from the server not via the service terminal, a communication application for performing the process to transmit the specified data to the service terminal, the communication application comprising a public key of the certificate authority and a program for performing local communication with the service terminal;
verifying means that verifies the server certificate on the basis of a public key of the certificate authority included in the communication application; and
when the verifying means verifies the server certificate of the service terminal, transmitting means that transmits the specified data to the service terminal by executing the program, in the communication application, to authenticate the portable terminal and perform local communication with the service terminal.

10. A portable terminal, according to claim 9, further comprising:
fourth receiving means that receives from the certificate authority, a client certificate certifying authenticity of the portable terminal.

11. A terminal communication method according to claim 1, wherein the specified data comprises music data.

12. A terminal communication method according to claim 1, wherein the specified data comprises image data.

13. A terminal communication method according to claim 1, wherein the specified data is selected from the group consisting of concert tickets and train tickets.

14. A terminal communication method according to claim 1, wherein the specified data comprises transaction data.

15. A terminal communication method according to claim 14, wherein the transaction data is selected from the group consisting of money data, issue data for issuing tickets, obtainment data for obtaining game programs, and coupon data.

16. A portable terminal according to claim 9, wherein the specified data comprises music data.

17. A portable terminal according to claim 9, wherein the specified data comprises image data.

18. A portable terminal according to claim 9, wherein the specified data is selected from the group consisting of concert tickets and train tickets.

19. A portable terminal according to claim 9, wherein the specified data comprises transaction data.

20. A portable terminal according to claim 19, wherein the transaction data is selected from the group consisting of money data, issue data for issuing tickets, obtainment data for obtaining game programs, and coupon data.

21. A terminal communication method according to claim 1, wherein the portable terminal is only able to transmit the specified data from the portable terminal by executing the program in the communication application that was transmitted by the server.

22. A portable terminal according to claim 9, wherein the portable terminal is only able to transmit the specified data from the portable terminal by executing the program in the communication application that was transmitted by the server.

23. A terminal communication method according to claim 1, wherein the communication application must be executed in order for the specified data to be transmitted from the portable terminal.

24. A terminal communication method according to claim 23, wherein the communication application limits transmission of the specified data to one or more local communications and prohibits transmission of the specified data via any network.

25. A portable terminal according to claim 9, wherein the communication application must be executed in order for the specified data to be transmitted from the portable terminal.

26. A terminal communication method according to claim 25, wherein the communication application limits transmission of the specified data to one or more local communications and prohibits transmission of the specified data via any network.

27. A terminal communication method, comprising:
   obtaining, at a portable terminal, specified data from a server not via a service terminal;
   obtaining, at the service terminal from a certificate authority, a server certificate encrypted by a secret key of the certificate authority, the server certificate indicating certification of the service terminal, the service terminal being a device different from the server;
   receiving, at the portable terminal, a local communication program and a public key of the certificate authority from the server not via the service terminal, the local communication program required to be executed in order transmit the specified data from the portable terminal to the service terminal, the local communication program limiting transmission of the specified data to one or more local communications and prohibiting transmission of the specified data via any network, the public key of the certificate authority being associated with the local communication program;
   obtaining, at the portable terminal, the server certificate from the service terminal;
   verifying, at the portable terminal, the server certificate on the basis of the public key of the certificate authority; and
   when the service terminal is authenticated by the portable terminal on the basis of the server certificate, executing the local communication program in order to authenticate the portable terminal, to limit transmission of the specified data from the portable terminal to the service terminal using only the local communication, and to prohibit transmission of the specified data using any network.

28. A terminal communication method according to claim 27, wherein the portable terminal receives a communication application, the communication application comprising the local communication program and the public key of the certificate authority.

29. A terminal communication method according to claim 1, wherein the service terminal is an entity separated from the portable terminal and the server.

* * * * *

UNITED STATES PATENT AND TRADEMARK OFFICE
CERTIFICATE OF CORRECTION

PATENT NO. : 7,962,744 B2  
APPLICATION NO. : 10/275932  
DATED : June 14, 2011  
INVENTOR(S) : Masaaki Yamamoto et al.

Page 1 of 1

It is certified that error appears in the above-identified patent and that said Letters Patent is hereby corrected as shown below:

Column 18, Line 5, please insert --to-- after "order".

Signed and Sealed this
Fourteenth Day of February, 2012

David J. Kappos
*Director of the United States Patent and Trademark Office*